United States Patent
Sunderrajan et al.

(10) Patent No.: US 6,762,003 B2
(45) Date of Patent: Jul. 13, 2004

(54) IMAGING MEMBER WITH AMORPHOUS HYDROCARBON RESIN

(75) Inventors: Suresh Sunderrajan, Rochester, NY (US); Narasimharao Dontula, Rochester, NY (US); Peter T. Aylward, Hilton, NY (US); Nicholas I. Phippen, Great Missenden (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/154,887

(22) Filed: May 24, 2002

(65) Prior Publication Data

US 2003/0219663 A1 Nov. 27, 2003

(51) Int. Cl.[7] .............................. G03C 1/79; G03C 1/93; G03C 8/52; G03G 5/10; B32B 27/06
(52) U.S. Cl. ........................ 430/60; 430/56; 430/201; 430/536; 430/538; 347/105; 428/483; 428/497; 428/498; 428/513; 428/523
(58) Field of Search ......................... 430/56, 60, 201, 430/536, 538; 347/105; 428/483, 497, 498, 513, 523

(56) References Cited

U.S. PATENT DOCUMENTS

| | | | |
|---|---|---|---|
| 3,148,059 A | | 9/1964 | Brunson et al. |
| 3,874,880 A | * | 4/1975 | Venor et al. ................ 430/536 |
| 4,365,044 A | | 12/1982 | Liu |
| 4,378,404 A | | 3/1983 | Liu |
| 4,514,452 A | * | 4/1985 | Tanaka et al. .............. 428/141 |
| 4,832,775 A | | 5/1989 | Park et al. |
| 4,921,749 A | | 5/1990 | Bossaert et al. |
| 4,939,063 A | * | 7/1990 | Tamagawa et al. ......... 430/536 |
| 5,188,875 A | * | 2/1993 | Yamaoka et al. ........... 428/497 |
| 5,213,744 A | | 5/1993 | Bossaert |
| 5,462,788 A | * | 10/1995 | Ohashi et al. .............. 428/523 |
| 5,466,519 A | * | 11/1995 | Shirakura et al. .......... 430/538 |
| 5,851,651 A | | 12/1998 | Chao |
| 5,866,282 A | | 2/1999 | Bourdelais et al. |
| 5,888,643 A | | 3/1999 | Aylward et al. |
| 6,030,742 A | | 2/2000 | Bourdelais et al. |
| 6,281,290 B1 | | 8/2001 | Klosiewicz |
| 6,447,976 B1 | * | 9/2002 | Dontula et al. ............. 430/536 |
| 6,514,659 B1 | * | 2/2003 | Dontula et al. ............. 430/536 |
| 6,531,214 B2 | * | 3/2003 | Carter et al. ................ 428/523 |
| 6,537,656 B1 | * | 3/2003 | Dontula et al. ............. 430/536 |

FOREIGN PATENT DOCUMENTS

| | | |
|---|---|---|
| EP | 0 247 898 A1 | 12/1987 |
| GB | 1003226 | 9/1965 |
| GB | 1035165 | 7/1966 |
| JP | 3-197940 * | 8/1991 |
| JP | 97106038 A | 4/1997 |
| JP | 97127648 A | 5/1997 |
| JP | 97179241 A | 7/1997 |
| JP | 2839905 B2 | 12/1998 |

OTHER PUBLICATIONS

Japanese Patent Abstract 04181243 (Jun. 29, 1992).
Japanese Patent Abstract XP–002246524 (Aug. 29, 1991).
Co–pending USSN 10/154,894, Aylward et al., *Imaging Element With Improved Surface And Stiffness (D–83848)*.

* cited by examiner

Primary Examiner—Richard L. Schilling
(74) Attorney, Agent, or Firm—Lynne M. Blank

(57) ABSTRACT

The present invention relates to an imaging member comprising an imaging layer and at least one stiffening layer comprising a blend of polyolefin polymer and amorphous hydrocarbon resin. The invention further describes a method for making the imaging member, comprising extruding a foam polymer sheet, orienting the foam polymer sheet, bringing a stiffening layer comprising a blend of polyolefin polymer and amorphous hydrocarbon resin into contact with the oriented foam polymer sheet, and applying an imaging layer above the stiffening layer. A second method of forming an imaging member comprises extruding a foam polymer sheet, bringing at least one stiffening layer comprising a blend of polyolefin polymer and amorphous hydrocarbon resin into contact with the foam polymer sheet, orienting said foam polymer sheet and said stiffening layer and applying an imaging layer above said stiffening layer. Another method describes the formation of an imaging member comprising making a cellulosic sheet, bringing at least one stiffening layer comprising a blend of polyolefin polymer and amorphous hydrocarbon resin into contact with the cellulosic sheet and applying an imaging layer above the stiffening layer.

84 Claims, No Drawings

IMAGING MEMBER WITH AMORPHOUS HYDROCARBON RESIN

CROSS REFERENCE TO RELATED APPLICATIONS

Reference is made to commonly assigned, co-pending U.S. patent application Ser. No. 10/154,894 by Aylward et al. filed of even date herewith entitled "Imaging Element With Improved Surface And Stiffness", the disclosures of which are incorporated herein.

FIELD OF THE INVENTION

This invention relates to imaging media. In a preferred form, it relates to supports for photographic, inkjet, thermal, and electrophotographic media.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for imaging media suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals, failing which, there is a stain present on the print border accompanied by a severe loss in image quality. In the formation of photo quality inkjet paper, it is important that the paper is readily wetted by ink and that it exhibits the ability to absorb high concentrations of ink and dry quickly. If the ink is not absorbed quickly, the elements block or stick together when stacked against subsequent prints and exhibit smudging and uneven print density. For thermal media, it is important that the support contain an insulative layer in order to maximize the transfer of dye from the donor which results in a higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base that has applied thereto a layer of polyolefin resin, typically polyethylene, on each side, which serves to provide waterproofing to the paper and also provides a smooth surface on which the photosensitive layers are formed. In another imaging material, as in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as $TiO_2$ above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create photo quality inkjet paper.

In all of the above imaging supports, multiple operations are required to manufacture and assemble all of the individual layers. For example, photographic paper typically requires a paper-making operation followed by a polyethylene extrusion coating operation, or, as disclosed in U.S. Pat. No. 5,866,282, a paper making operation is followed by a lamination operation for which the laminates are made in yet another extrusion casting operation. There is a need for imaging supports that can be manufactured in a single in-line manufacturing process while still meeting the stringent features and quality requirements of imaging bases.

It is also well known in the art that traditional imaging bases consist of raw paper base. For example, in typical photographic paper as currently made, approximately 75% of the weight of the photographic paper comprises the raw paper base. Although raw paper base is typically a high modulus, low cost material, there exist significant environmental issues with the paper manufacturing process. There is a need for alternate raw materials and manufacturing processes that are more environmentally friendly. Additionally to minimize environmental impact, it is important to reduce the raw paper base content, where possible, without sacrificing the imaging base features that are valued by the customer, i.e., strength, stiffness, surface properties, and the like, of the imaging support.

An important corollary of the above is the ability to recycle photographic paper. Current photographic papers cannot be recycled because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging base changes as a function of the humidity of its immediate environment. There is a need for an imaging support that minimizes curl sensitivity as a function of humidity, or ideally, does not exhibit curl sensitivity.

The stringent and varied requirements of imaging media, therefore, demand a constant evolution of material and processing technology. One such technology known in the art as polymer foams has previously found significant application in food and drink containers, packaging, furniture, appliances, and the like. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to said major surface of the polystyrene foam substrate. The foregoing composite foam/film structure can be shaped by conventional processes as thermoforming to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in imaging media. For example, JP 2839905 B2 discloses a 3-layer structure comprising a foamed polyolefin layer on the image-receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper base using a hot melt adhesive. The disclosure JP 09127648 A highlights a variation of the JP 2839905 B2 structure, in which the resin on the backside of the paper base is foamed, while the image receiving side resin layer is unfoamed. Another variation is a 4-layer structure highlighted in JP 09106038 A. In this, the image receiving resin layer comprises 2 layers, an unfoamed resin layer which is in contact with the emulsion, and a foamed resin layer which is adhered to the paper base. There are several problems with this, however. Structures described in the foregoing patents need to use foamed layers as thin as 10 μm to 45 μm, since the foamed resin layers are being used to replace existing resin coated layers to the paper base. The thickness restriction is further needed to maintain the structural integrity of the photographic paper base since the raw paper base is providing the stiffness. It is known by those versed in the art of foaming that it is very difficult to make thin uniform foamed films with substantial reduction in density especially in the thickness range noted above.

Another key feature of imaging media is bending stiffness. It is well known that stiffness of an imaging element is a function of the modulus of the various layers of the imaging element, the location of the various layers (particularly in terms of the distance from the bending axis) and the overall caliper of the imaging element. Improvements that can be made to the modulus of the various layers comprising the imaging element can increase the overall bending stiffness of the element thus, in turn, increasing its value as an imaging support.

Organic additives that have the potential to enhance the modulus of a polyolefin film are known in the art. The composition of the organic additive, which is typically a hydrocarbon resin, must be such that it exhibits a higher glass transition temperature (Tg) than polyolefin, for example, propylene. It must also be compatible with polyolefins such as propylene. It is believed that the addition of the organic additive increases the Tg of the amorphous polyolefin, leading to a densification of the amorphous phase over time, which leads to increased stress transfer between crystalline regions (also called a pseudonetwork effect) that, in turn, leads to increasing stiffness. For example, Bossaert et al. in U.S. Pat. No. 4,921,749 claim a polyolefin film comprising a base layer of 70% to 97% polypropylene and 30% to 3% hydrogenated resin. The addition of about 20% hydrogenated resin is shown to result in an increase in modulus of about 10–20%. Klosiewicz, in U.S. Pat. No. 6,281,290 claims a process for producing a master batch for a polypropylene article (film, fiber, sheet, or bottle) comprising a mixture of polypropylene, high density polyethylene and hydrocarbon resin having a Ring and Ball softening point of at least 70 degrees Centigrade. The addition of low levels of hydrocarbon resin and high density polyethylene (HDPE) are reported to increase the tensile modulus of extrusion cast polypropylene films by 15% to 70%. C-S Liu, in U.S. Pat. No. 4,365,044, discloses an extrusion-coatable polypropylene composition comprising a hydrogenated copolymer of vinyl toluene, alpha-methyl styrene, and low density polyethylene. Extrusion coatability at speeds up to about 900 feet per minute (274 meters/min.) and good adhesion to cellulose substrates is claimed.

PROBLEM TO BE SOLVED BY THE INVENTION

There is a need for a composite material that can be manufactured in a single in-line operation and that meets all the requirements of an imaging base, especially the bending stiffness requirements. There is also a need for an imaging base that reduces the amount of raw paper base that is used and can be effectively recycled. There is also a need for an imaging base that resists the tendency to curl as a function of ambient humidity.

SUMMARY OF THE INVENTION

These and other objects of the invention are accomplished by an imaging member comprising an imaging layer and at least one stiffening layer comprising a blend of polyolefin polymer and amorphous hydrocarbon resin having a softening temperature of greater than 30 degrees Centigrade. The invention further describes a method for making the imaging member, comprising extruding a foam polymer sheet, orienting the foam polymer sheet, bringing a stiffening layer comprising a blend of polyolefin polymer and amorphous hydrocarbon resin into contact with the oriented foam polymer sheet, and applying an imaging layer above the stiffening layer. A second method of forming an imaging member comprises extruding a foam polymer sheet, bringing at least one stiffening layer comprising a blend of polyolefin polymer and amorphous hydrocarbon resin into contact with the foam polymer sheet, orienting said foam polymer sheet and said stiffening layer and applying an imaging layer above said stiffening layer. Another method describes the formation of an imaging member comprising making a cellulosic sheet, bringing at least one stiffening layer comprising a blend of polyolefin polymer and amorphous hydrocarbon resin into contact with the cellulosic sheet and applying an imaging layer above the stiffening layer.

This invention provides a superior imaging support. Specifically, it provides an imaging support of high stiffness, excellent smoothness, high opacity, and excellent humidity curl resistance. In one embodiment, it also provides an imaging support that can be manufactured using a single in-line operation that can be effectively recycled.

The present invention offers several advantages. The invention produces an element or member that has much less tendency to curl when exposed to extremes in humidity. In one embodiment, the ability to manufacture the element or member in a single in-line operation significantly lowers element manufacturing costs and may eliminate disadvantages in the manufacturing of the current generation of imaging supports, such as very tight moisture specifications in the raw base and specifications to minimize pits during resin coating. In one embodiment, the element or member can also be recycled to recover and reuse polyolefin instead of being discarded into landfills.

DETAILED DESCRIPTION OF THE INVENTION

This invention teaches the use of a higher modulus stiffening flange layers that provide the needed stiffness for an imaging support, especially when surrounding a core on one or both sides. The high modulus stiffening flange layers may, in turn, comprise organic stiffness enhancing materials.

Using this approach, many new features of the imaging base may be exploited and restrictions in manufacturing eliminated. High modulus materials or layers are defined herein as having a modulus of greater than 100,000 psi or 689 MPa.

The prior art is primarily limited to teaching the application of organic stiffening additives to extrusion cast film applications. There is no prior art in the application of such stiffening additives to imaging elements. Traditional imaging elements derive a predominant fraction of their bending stiffness from the cellulose paper substrate and as such do not require the use of organic stiffening additives. However, in the case of foam core imaging elements, there is potentially a significant application of such technology if it is shown to be viable for polyolefin foam elements and for extrusion coating processes. C-S Liu, in U.S. Pat. No. 4,365,044, discloses an extrusion-coatable polypropylene composition comprising a hydrogenated copolymer of vinyl toluene, alpha-methyl styrene, and low density polyethylene. Extrusion coatability at speeds up to about 900 feet per minute (274 m/min.) and good adhesion to cellulose substrates is claimed. However, such a composition is not suitable for use in an imaging element.

The present invention describes an imaging member comprising an imaging layer and at least one stiffening layer comprising a blend of polyolefin polymer and amorphous hydrocarbon resin, preferably having a softening temperature of greater than 30 degrees Centigrade. In a preferred embodiment, the stiffening layer is affixed to a support to form a composite comprising a core layer, at least one stiffening flange layer with an imaging layer applied thereon. The invention further describes methods for making the imaging member. It should also be noted that the cellulosic sheet described in one method may also be a inorganic coated cellulosic sheet or even fabric. Additionally, this method and the other methods described herein may also contain hydrocarbon resin having carbon backbone units of between 8 and 24. This resin may be a pure monomer hydrocarbon resin, physical blends of hydrogenated hydrocarbon resins, partially hydrogenated hydrocarbon resins, fully hydrogenated hydrocarbon resins, or polyterpenes. Furthermore, the stiffening layer of this method may also contain talc and or $TiO_2$ to enhance the overall opacity. It should be noted that almost any white pigment known in the art may be useful in this invention. Additionally, in the formation of this imaging element by this method, there may be a polyethylene and/or subbing layer between the stiffening layer and the image layer.

Imaging element or members are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important for the same transport reasons through photofinishing equipment that the caliper of the imaging element be constrained between 75 μm and 350 μm.

Imaging elements are also constrained by consumer performance and present processing machine restrictions to a stiffness range of between approximately 50 mN and 250 mN and a caliper range of between approximately 100 μm and 400 μm. In the design of the element or member of the invention, there exists a relationship between stiffness of the imaging element and the caliper and modulus of the core and modulus of the stiffening flange layers, i.e., for a given core thickness, the stiffness of the element can be altered by changing the caliper of the stiffening flange elements and/or changing the modulus of the stiffening flange elements and/or changing the modulus of the core. The stiffening effect of the present invention may occur as a result of increasing modulus which, in turn, increases stiffness. When the present invention is applied to a conventional paper core, a thinner paper core may be used to produce a support or base having the same stiffness as conventional paper support. Further, base or support layers may be made from materials which were previously lacking the necessary stiffness to be useful as the core of an imaging element or member.

If the target overall stiffness and caliper of the imaging element or member are specified then for a given core thickness and core material, the target caliper and modulus of the stiffening flange elements are implicitly constrained. Conversely, given a target stiffness and caliper of the imaging element for a given caliper and modulus of the stiffening flange layers, the core thickness and core modulus are implicitly constrained.

The stiffening flange layers of the composite sheet can be made of a homopolymer such as a polyolefin, polystyrene, polyvinylchloride or other typical thermoplastic polymers, their copolymers or their blends thereof, or other polymeric systems like polyurethanes, and polyisocyanurates. The composite sheet can be made with stiffening flange(s) of the same polymeric material as the core matrix, or it can be made with stiffening flange(s) of different polymeric composition than the core matrix.

Other solid phases may be present in the core in the form of fillers that are of organic (polymeric, fibrous) or inorganic (glass, ceramic, metal) origin. The fillers may be used for physical, optical (lightness, whiteness, and opacity), chemical, or processing property enhancements of the core.

In a preferred lamination embodiment of this invention, the stiffening or flange layers used comprise high modulus polymers, preferably having a modulus between 700 MPa to 10500 MPa, such as low density polyethylene, high density polyethylene, polypropylene, or polystyrene, their blends or their copolymers, that have been stretched and oriented. They may be filled with suitable filler materials to increase the modulus of the polymer and/or to enhance other properties such as opacity and smoothness. In a preferred extrusion coating embodiment of this invention, the stiffening flange layers used comprise high modulus extrusion-coatable polymer compositions such as high density polyethylene, polypropylene, or polystyrene, their blends or their copolymers, filled with suitable filler materials. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, polyester fibers, and the like. The preferred fillers are talc, mica, and calcium carbonate because they provide excellent modulus enhancing properties. Extrusion coating thicknesses useful to this invention are of caliper between about 10 μm and about 150 μm, preferably between about 25 μm and about 75 μm.

Another key additive to lamination polymer sheets/layers or extrusion coatable compositions to enhance physical properties such as modulus and stiffness of the imaging element or member is a low molecular weight substantially amorphous resin or rosin additive. The low molecular weight resin or rosin additive, preferably hydrogenated, has a number average molecular weight below that of the polyolefin to which it is added. The additive resin or rosin may be natural or it may be synthetic. Examples of suitable resins are amorphous petroleum hydrocarbons, coal or petroleum derivatives, substituted hydrocarbons or hydrocarbon derivatives such as polyterpene resins, rosins, rosin derivatives, and styrene resins. These materials may be characterized using the Ring and Ball softening point test and typically have a softening temperature in the range from about 30 degrees Centigrade to about 200 degrees Centigrade, and more typically in the range from about 70 degrees Centigrade to about 180 degrees Centigrade. The additive resin must exhibit a higher glass transition temperature (Tg) than the matrix polymer and must be, at least to a limited extent, compatible with the matrix polymer. For example, if the matrix polymer is polypropylene, then the additive resin must have a higher glass transition temperature than polypropylene. It must also be compatible with polypropylene. Compatibility with the matrix polymer may be manipulated by reducing the average molecular weight of the resin additive or functionalizing the resin additive. For example, the resin additive may be functionalized with a polar functional group for use with a polar matrix polymer.

The resin additive is typically added from about 2% concentration by weight to about 50% concentration by weight. Preferably, it is added from about 10% concentration by weight to about 20% concentration by weight. At an addition level of less than 2%, there is little change in the desired modulus. At addition levels greater than about 50%, processability becomes a concern due to poor chill roll release. Examples of resin additives include, but are not limited to, master batched materials, for example, cyclopentadiene derivatives such as a hydrogenated cyclopentadiene master batched with polypropylene such as PA-609 made by Exxon Mobil, or pure monomer hydrocarbon resins master batched with a polyolefin such as Plastolyn® P2539 made by Eastman Chemical Co., physical blends of hydrogenated hydrocarbon resins and polymer such as Res® P2567, partially hydrogenated aliphatic hydrocarbon resins such as Res® A2661, or fully hydrogenated aliphatic hydrocarbon resins such as the Regalite® R1125 or Regalite® V3140, or hydrogenated pure aromatic resins such as Regalrez® 1139, or polyterpenes such as Piccolyte® C135, and the like. Preferred hydrocarbon resins may contain carbon backbone units of between 8 and 24.

In the most preferred embodiment, the imaging member of the invention comprises a polymer foam core that has adhered thereto an upper and a lower flange or stiffening layer. The polymer foams of this core are true foams, and have also been referred to as cellular polymers, foamed plastic, or expanded plastic. Polymer foams are multiple phase systems comprising a solid polymer matrix that is continuous and a gas phase. These closed cell foams are not synonymous with voided polymers or voided polymer layers, which are created through the addition of an incompatible phase or void-initiating particle to a polymer matrix, followed by orientation in which voids are created in the matrix polymer as it is stretched around the void-initiating particles, leaving the void-initiating particles to remain in the voids of the finished sheet. These foams have been created by the use of a blowing agent.

The polymer foam useful in this invention may comprise a homopolymer such as a polyolefin, polystyrene, polyvinylchloride or other typical thermoplastic polymers, their copolymers or their blends thereof, or other polymeric systems like polyurethanes, polyisocyanurates that has been expanded through the use of a blowing agent to consist of two phases, a solid polymer matrix, and a gaseous phase. Other solid phases may be present in the foams in the form of fillers that are of organic (polymeric, fibrous) or inorganic (glass, ceramic, metal) origin. The fillers may be used for physical, optical (lightness, whiteness, and opacity), chemical, or processing property enhancements of the foam.

Other solid phases may be present in the foams in the form of fillers that are of organic (polymeric, fibrous) or inorganic (glass, ceramic, metal) origin. The fillers may be used for physical, optical (lightness, whiteness, and opacity), chemical, or processing property enhancements of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure, the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis (benzene sulfonyl hydrazide) (OBSH), N,N'-dinitrosopentamethyltetramine (DNPA), sodium borohydride, and other blowing agents well known in the art. Polyethylene and polypropylene, their blends and their copolymers are preferred due to their ready availability, common usage, low cost and excellent adherence to the stiffening flange of the present invention. The preferred chemical blowing agents would be sodium bicarbonate/citric acid mixtures, azodicarbonamide, though others can also be used. If necessary, these foaming agents may be used together with an auxiliary foaming agent, nucleating agent, and a cross-linking agent.

The stiffening flange layers with the core of this invention are chosen to satisfy specific requirements of flexural modulus, caliper, surface roughness, and optical properties such as colorimetry and opacity. The stiffening flange members may be formed integral with a core by manufacturing the core with a stiffening flange skin layer or extrusion coating the stiffening flange onto the core materials or the stiffening flange may be laminated to the core material. The integral extrusion of stiffening flange members with the core is preferred for cost. The layers may be either preformed and adhered to each other or coextruded. The lamination technique allows a wider range of properties and materials to be used for the skin materials.

The preferred range in caliper of the core is from 25 $\mu$m to 350 $\mu$m. The most preferred caliper range is between 75

μm and 350 μm. The preferred modulus of the core varies from 30 MPa to 10500 MPa. The preferred range in caliper of the flange layer is between 5 μm and 175 μm and modulus of 100 MPa to 10500 MPa. These ranges are preferred across the range of non-foam, such as paper based, and foam based cores because of the preferred overall caliper range of the element which lies between 100 μm and 400 μm with a stiffness of between 50 and 250 mN.

Preferred ranges of non-foam based core caliper and modulus and stiffening flange caliper and modulus follow: the preferred caliper of the core of the invention ranges between 25 μm and 300 μm, the preferred caliper of the stiffening flange layers of the invention ranges between 5 μm and 75 μm, the preferred modulus of the core of the invention ranges between 3000 MPa and 10500 MPa, and the preferred modulus of the stiffening flange layers of the invention ranges from 100 MPa to 3500 MPa. In each case, the above range is preferred because of (a) consumer preference, (b) manufacturability, and (c) materials selection. It is noted that the final choice of stiffening flange and core materials, modulus, and caliper will be a subject of the target overall element stiffness and caliper.

Preferred ranges of foam core caliper and modulus and stiffening flange caliper and modulus follow: the preferred caliper of the foam core of the invention ranges between 200 μm and 350 μm, the preferred caliper of the stiffening flange layers of the invention ranges between 10 μm and 175 μm, the preferred modulus of the foam core of the invention ranges between 30 MPa and 1000 MPa, and the preferred modulus of the stiffening flange layers of the invention ranges from 700 MPa to 10500 MPa. The range in density reduction of the foam core is from 20% to 95%. The preferred range in density reduction is between 40% and 70%. This is because it is difficult to manufacture a uniform foam product with very high density reduction (over 70%). Density reduction is the percent difference between solid polymer and a particular foam sample. It is also not economical to manufacture a product with density reduction less than 40%.

The selection of core material, the extent of density reduction (foaming) and the use of any additives/treatments determine the core modulus. The selection of stiffening flange materials and treatments (for example, the use of inorganic fillers such as talc for polymeric stiffening flange materials) determines the stiffening flange modulus. In the preferred embodiment, the modulus of the core will be lower than the modulus of the stiffening flange layer or layers.

For example, at the low end of target stiffness (50 mN) and caliper (100 μm), given a typical non-foam based core of caliper 50 μm and modulus 4826 MPa, the stiffening flange layer caliper is then constrained to 62.5 μm on each side of the core, and the stiffening flange modulus required is 1700 MPa. Also, for example, at the high end of target stiffness (250 mN) and caliper (350 μm), given a typical non-foam based core of caliper 200 μm and modulus 4136 MPa, the stiffening flange layer caliper is constrained to 75 μm on each side and the stiffening flange modulus required is 140 MPa.

For example, at the low end of target stiffness (50 mN) and caliper (100 μm), given a typical polyolefin foam of caliper 50 μm and modulus 137.9 MPa, the stiffening flange layer caliper is then constrained to 25 μm on each side of the core, and the stiffening flange modulus required is 10343 MPa. Also, for example, at the high end of target stiffness (250 mN) and caliper (400 μm), given a typical polyolefin foam of caliper 300 μm and modulus 137.9 MPa, the stiffening flange layer caliper is constrained to 50 μm on each side and the stiffening flange modulus required is 1034 MPa. It is seen from the above explanation that the higher the modulus of the stiffening flange layers, the lower the necessary caliper to achieve a target stiffness.

The element or members of the invention can be made using several different manufacturing methods. In a preferred embodiment comprising oriented sheets, the coextrusion, quenching, orienting, and heat setting of the element may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core component of the element, especially foam, and the polymeric integral stiffening flange components are quenched below their solidification temperature. The stiffening flange components may be extruded through a multiple stream die. In a preferred embodiment utilizing a foam core, the outer stiffening flange forming polymer streams may not contain foaming agent or, alternatively, the surface of the foaming agent containing polymer may be cooled to prevent surface foaming and form a stiffening flange. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining, to some degree, the sheet against retraction in both directions of stretching.

The element or member of the invention may also be manufactured through a three-stage process that may, but is not limited to, be in a single, in-line manufacturing process. In the case of a foam core, the first stage of this process involves the creation of a foamed sheet at a density reduction of between 1% and 30% or, alternatively, percent of solid density of between 99% and 70%. The next stage of this process involves the orientation and voiding of this foamed sheet to further reduce the density of the sheet. After the second stage the density reduction achieved is between 30% and 70% or, alternatively, percent of solid density of between 70% and 30% of the original formulation. The final stage of this process involves the addition of stiffening flange layers to the reduced density sheet. This may be done through extrusion coating or through extrusion lamination operations. In addition, surface skin layers for smoothness, primer coats for adhesion, and the like, may be used as needed.

If voiding is part of the manufacturing process a necessary component of the core materials is an incompatible phase that may be of inorganic (glass, ceramic, mineral, metal salt) or organic (polymeric, fibrous) origin. This component is important for further density reduction through voiding during the orientation process. Other solid phases may also be present in the core in the form of fillers that are of organic (polymeric, fibrous) or inorganic (glass, ceramic, metal) origin. This material is a void initiator. The void-initiating particles which remain in the finished packaging sheet core should be from 0.1 to 10 μm in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse. The voids can be tailored to favor open cells for imaging techniques where a porous element or member is desired. During the orientation process, it is also likely that cells that may have been formed during an optional foaming process are further stretched, increasing the density reduction, or alternatively, further reducing percent of solid density.

The void-initiating material may be selected from a variety of materials, and should be present in an amount of about 5–70% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, polystyrene in polypropylene, or polypropylene dispersed in polyethylene terephthalate.

If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical, acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl, copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms, acrylic acid, methacrylic acid, itaconic acid, citraconic acid, maleic acid, fumaric acid, oleic acid, vinylbenzoic acid, the synthetic polyester resins which are prepared by reacting terephthalic acid and dialkyl terephthalics or ester-forming derivatives thereof, with a glycol of the series HO(CH$_2$)$_n$ OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, and the like. Preferably, the cross-linked polymer is polystyrene or poly(methyl methacrylate). Most preferably, it is polystyrene and the cross-linking agent is divinylbenzene.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension are preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the polyolefin sheet is utilized for the oriented sheet, suitable classes of thermoplastic polymers of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene and polyethylene are preferred, because they are low in cost and have desirable strength properties. Further, current light sensitive silver halide coatings have been optimized to adhere to polyethylene.

The element or member, while described in one embodiment as having preferably at least three layers of a core and a stiffening flange layer on each side, may also be provided with additional layers that may serve to change the properties of the element or member. Imaging elements could be formed with surface layers that would provide an improved adhesion or look. The imaging member could be formed with a polyethylene layer between the stiffening layer and the imaging layer for adhesion of gelatin based imaging layers. The imaging member could be formed with a subbing layer between said stiffening layer and said imaging layer to enhanced adhesion to a variety of polymers including gelatin.

These element or members may be coated or treated after the coextrusion and/or orienting process or between casting and/or full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

The element or member may also be made through the extrusion laminating process. Extrusion laminating is carried out by bringing together the polymeric stiffening flange layers of the invention and the core with application of an adhesive between them, followed by their being pressed in a nip such as between two rollers. The adhesive may be applied to either the stiffening flange layers or the core prior to their being brought into the nip. In a preferred form, the adhesive is applied into the nip simultaneously with the stiffening flange layers and the core. The adhesive may be any suitable material that does not have a harmful effect upon the element. A preferred material is polyethylene that is melted at the time it is placed into the nip between the core and the stiffening flange layer. Addenda may also be added to the adhesive layer. Any know material used in the art to improve the optical performance of the system may be used. The use of $TiO_2$ is preferred. During the lamination process also, it is desirable to maintain control of the tension of the stiffening flange layers in order to minimize curl in the resulting laminated receiver support.

In a preferred extrusion coating embodiment of this invention, the stiffening flange members are coated onto the core through an extrusion coating operation in contact with a textured chill-roll or similar technique known by those skilled in the art. The preferred materials comprise high modulus polymers may be blended with other polymers such as low density polyethylene, branched polypropylene, and the like, which may improve their extrusion coatability, and any desirable additives that improve coatability and features, but must be blended to maintain the necessary stiffness. It may be necessary to use various additives such as antioxidants, slip agents, or lubricants, and light stabilizers. These additives are added to improve, among other things, the dispersibility of fillers and/or colorants, as well as the thermal and color stability during processing and the manufacturability and the longevity of the finished article. For example, the coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3', 5'-di-tert-butyl-4'-hydroxyphenyl propionate), combinations of the above, and the like, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl) imino]}(Chimassorb 944 LD/FL).

In another embodiment of this invention, the stiffening flange layers used comprise paper on one side of a core and a high modulus polymeric material on the other side. In another embodiment, an integral skin may be bonded to one side and another skin bonded or laminated to the other side of a core. In yet another embodiment, the stiffening flange layer may be bonded to a fabric. The stiffening flange layers may also comprise an oriented layer or layers and be bonded to a light transmissive polymer sheet. Preferably, the transmissive sheet has a light transmission of greater than 20%.

The caliper of the paper and of the high modulus polymeric material is determined by the respective flexural modulus such that the overall stiffness of the imaging element or member lies within the preferred range, and the bending moment around the central axis is balanced to prevent excessive curl.

In addition to the stiffness and caliper, an imaging element or member needs to meet constraints in surface smoothness and optical properties such as opacity and colorimetry. Surface smoothness characteristics may be met during stiffening flange-layer manufacturing operations such as during paper making or during the manufacture of oriented polymers like oriented polystyrene. Alternatively, it may be met by extrusion coating additional layer(s) of polymers such as polyethylene onto the stiffening flange layers in contact with a textured chill-roll or similar technique known by those skilled in the art. Optical properties such as opacity and colorimetry may be met by the appropriate use of filler materials such as titanium dioxide and calcium carbonate and colorants, dyes and/or optical brighteners or other additives known to those skilled in the art. The fillers may be in the stiffening flange or an overcoat layer, such as polyethylene. Generally, base materials for color print imaging materials are white, possibly with a blue tint as a slight blue is preferred to form a preferred white look to whites in an image. Any suitable white pigment may be incorporated in the polyolefin layer such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the stiffening flange or resin coat layers. The preferred pigment is titanium dioxide. In addition, suitable optical brightener may be employed in the polyolefin layer including those described in Research Disclosure, Vol. No. 308, December 1989, Publication 308119, Paragraph V, page 998.

In addition, it may be necessary to use various additives such as antioxidants, slip agents, or lubricants, and light stabilizers in the plastic elements as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly{[6-[(1,1,3, 3-tetramethylbutylamino}-1,3,5-triazine-4-piperidinyl)-imino]-1,6-hexanediyl[{2,2,6,6-tetramethyl-4-piperdinyl) imino]}(Chimassorb 944 LD/FL).

A typical imaging element or member also requires an auxiliary or antistatic layer for charge dissipation during high speed transport in manufacturing, finishing or post-processing applications. The problem of controlling static charge is well known in the field of photography and imaging. The accumulation of charge on film or paper surfaces leads to the attraction of dirt, which can produce physical defects. The discharge of accumulated charge during or after the application of a light sensitive photography emulsion layer(s) can produce irregular fog patterns or "static marks" in the emulsion. The static problems have been aggravated by increase in the sensitivity of new emulsions, increase in coating machine speeds, and increase in post-coating drying efficiency. The charge generated during the coating process may accumulate during winding and unwinding operations, during transport through the coating machines and during finishing operations such as slitting and spooling.

It is generally known that electrostatic charge can be dissipated effectively by incorporating one or more electrically-conductive "antistatic" layers into the imaging member. Antistatic layers can be applied to one or to both sides of the imaging member as subbing layers either beneath or on the side opposite to the light-sensitive silver halide emulsion layers. An antistatic layer can alternatively be applied as an outer coated layer either over the emulsion layers or on the side of the imaging member base opposite to the light sensitive emulsion layers or both. For some applications, the antistatic agent can be incorporated into the emulsion layers. Alternatively, the antistatic agent can be directly incorporated into the imaging member base itself.

A wide variety of electrically-conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles. However, these antistatic layers typically contain a high volume percentage of electronically conducting materials which are often expensive and impart unfavorable physical characteristics, such as color, increased brittleness and poor adhesion, to the antistatic layer.

Besides antistatic properties, an auxiliary layer in a photographic element or member maybe required to fulfill additional criteria depending on the application. For example for resin-coated photographic paper, the antistatic layer if present as an external backing layer should be able to receive prints (e.g., bar codes or other indicia containing useful information) typically administered by dot matrix printers and to retain these prints or markings as the paper undergoes processing. Most colloidal silica based antistatic backings without a polymeric binder provide poor post-processing backmark retention qualities for photographic paper. Typical antistat used in this application include a conductive agent comprises alkali metal salts of polyacids or cellulose derivatives. Other conductive agent comprises polymerized alkylene oxides and alkali metal salts.

For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and an alkyl-substituted trifunctional aziridine crosslinking agent is disclosed. An antistatic layer comprising a vanadium pentoxide colliodal gel is described in U.S. Pat. No. 4,203,769. U.S. Pat. Nos. 4,237,194, 4,308,332, and 4,526,706 describe antistats based on polyaniline salt-containing layers. Crosslinked vinylbenzyl quaternary ammonium polymer antistatic layers are described in U.S. Pat. No. 4,070,189.

In an additional embodiment of this invention said at least one stiffening layer comprising a blend of polyolefin polymer and amorphous hydrocarbon resin having a softening temperature of greater than 30 degrees Centigrade is bonded to paper. The combination of high modulus paper with a polyolefin layer with at least one stiffening enhancing amorphous hydrocarbon on one or both sides provides an imaging member that is very stiff and easy to handle. The combination of paper and stiffening enhanced layer(s) provides an opportunity to optimize the individual layer thickness and adjust the final feel the print. Additional the overall cost the imaging print may be optimized. The paper used in this embodiment may be any paper known in the art that provides the desired attributes of imaging media. Such attributes include smoothness, overall color appearance, whiteness, surface appearance. In a further embodiment of this invention a least one stiffening layer may be bonded to coated paper. Coated paper provides an advantage over paper in that the surface is typically smoother which is critical in providing a smooth surface that is resistant to the formation of pits and other surface irregularities that can detract from the quality of the image. Additionally, coated layer on paper may also further enhance the overall stiffness of the imaging element or member. When a stiff coated paper is used in combination with a stiffening enhanced polyolefin flange, additional stiffness achieved. This is important in providing the desired feel and handling characteristics of a print. Any coated paper may be used in this embodiment that is known in the art. Typical coated layers may include white pigments such as $CaCO_3$, talc, $BaSO_4$, $TiO_2$, Clays and other white pigments know in the art.

Used herein, the phrase 'imaging element or member' comprises an imaging support as described above along with an image receiving layer as applicable to multiple techniques governing the transfer of an image onto the imaging element. Such techniques include thermal dye transfer with thermosensitive imaging materials, electrophotographic printing, or inkjet printing, as well as a support for photographic silver halide images. As used herein, the phrase "photographic element or member" is a material that utilizes photosensitive silver halide in the formation of images.

The thermal dye image-receiving layer of the receiving elements may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 g/m². An overcoat layer may be further coated over the dye-receiving layer, such as described in U.S. Pat. No. 4,775,657 of Harrison et al.

Dye-donor elements that are used with the dye-receiving element conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use are described, e.g., in U.S. Pat. Nos. 4,916,112, 4,927,803, and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads which can be used to transfer dye from dye-donor elements to receiving elements are available commercially. There can be employed, for example, a Fujitsu Thermal Head (FTP-040 MCS001), a TDK Thermal Head F415 HH7-1089, or a Rohm Thennal Head KE 2008-F3. Alternatively, other known sources of energy for thermal dye transfer may be used, such as lasers as described in, for example, GB No. 2,083,726A.

A thermal dye transfer assemblage comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps, the use of liquid toners in place of dry toners is simply one of those variations.

The first basic step, creation of an electrostatic image, can be accomplished by a variety of methods. In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as inkjet imaging media, the recording element or members or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known inkjet receiver layer can be used in the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 $\mu$m, preferably about 0.25 to about 3 $\mu$m.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer (TL) at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based DRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based DRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving element or members as described above can be successfully used, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

In one preferred embodiment, in order to produce photographic element or members, the composite support sheet is coated with a photographic element or elements. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element or member, including the layers of the image-forming units, can be arranged in various orders as known in the art. In an alternative format, the emulsions sensitive to each of the three primary regions of the spectrum can be disposed as a single segmented layer.

The photographic emulsions useful with this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40 C to 70 C, and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea, reducing agents, e.g., polyamines and stannous salts, noble metal compounds, e.g., gold, platinum, and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular or core/shell grains. Grains having a tabular or cubic morphology are preferred.

The photographic element or members of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850, 2,512,925, and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic element or members of this invention may use emulsions doped with Group VII metals such as iridium, rhodium, osmium, and iron as described in Research Disclosure, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element or member comprises the invention laminated support bearing a cyan dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic element or members may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m. The invention may be utilized with the materials disclosed in Research Disclosure, September 1997, Item 40145. The invention is particularly suitable for use with the material color paper examples of sections XVI and XVII. The couplers of section II are also particularly suitable. The Magenta I couplers of section II, particularly M-7, M-10, M-18, and M-18, set forth below are particularly desirable. In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the element or members of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation including |
| 3 | I, II, III, IX A & B | hardeners, coating aids, addenda, etc. |
| 1 | III, IV | Chemical sensitization and |
| 2 | III, IV | spectral sensitization/ |
| 3 | IV, V | Desensitization. |
| 1 | V UV | dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| I | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4.TM. (Eastman Kodak Company) Process or other processing systems suitable for developing high chloride emulsions. This invention is also directed towards a photographic recording element comprising a support and at least one light sensitive silver halide emulsion layer comprising silver halide grains as described above.

The following examples illustrate the practice of this invention. They are not intended to be exhaustive of all possible variations of the invention. Parts and percentages are by weight unless otherwise indicated.

EXAMPLES

Paper base was produced for the examples of this invention using a standard fourdrinier paper machine and a blend of mostly bleached hardwood Kraft fibers. The fiber ratio consisted primarily of bleached poplar (38%) and maple/beech (37%) with lesser amounts of birch (18%) and softwood (7%). Fiber length was reduced from 0.73 mm length weighted average as measured by a Kajaani FS-200 to 0.55 mm length using high levels of conical refining and low levels of disc refining. Fiber lengths from the slurry were measured using a FS-200 Fiber Length Analyzer (Kajaani Automation Inc.). Energy applied to the fibers is indicated by the total Specific Net Refining Power (SNRP) was 127 KW hr/metric ton. Two conical refiners were used in series to provide the total conical refiners SNRP value. This value was obtained by adding the SNRPs of each conical refiner. Two disc refiners were similarly used in series to provide a total Disk SNRP. Neutral sizing chemical addenda, utilized on a dry weight basis, included alkyl ketene dimer at 0.20% addition, cationic starch (1.0%), polyaminoamide epichlorhydrin (0.50%), polyacrylamide resin (0.18%), diaminostilbene optical brightener (0.20%), and sodium bicarbonate. Surface sizing using hydroxyethylated starch and sodium chloride was also employed but is not critical to the invention. In the $3^{rd}$ Dryer section, ratio drying was utilized to provide a moisture bias from the face side to the wire side of the sheet. The face side (emulsion side) of the sheet was then remoisturized with conditioned steam immediately prior calendering. Sheet temperatures were raised to between 76° C. and 93° C. just prior to and during calendering. The paper was then calendered to an apparent density of 1.17. Moisture levels after the calender were 7.0% to 9.0% by weight. Paper base B was produced at a basis weight of 178 $g/mm^2$ and thickness of 0.1524 mm.

Example 1

Control

The base for this example was prepared by coating polypropylene on each side of a standard cellulose photographic paper base at a coverage of 36.6 $g/m^2$ on each side. The polypropylene was an extrusion coating-grade high melt strength polypropylene homopolymer. The polypropylene was ProFax® PF611, MFR 30g/10 min and was obtained from Basell and extruded onto cellulose paper base (Sample 1A). The extrusion coating conditions are listed in Table 1 and were maintained constant for all Examples 1 through 7 and 9 through 15. Release sheets coated with silicone were inserted between the paper and the extrudate so as to obtain a thin film of the extrudate. The Young's modulus for the thin film was then measured using a Fast Tensile test using the procedure stated below.

TABLE 1

| Extrusion coating conditions | |
|---|---|
| Die | Egan 32 |
| Extruder size | 1.5 inch (0.038 m) |
| Extruder barrel zone settings | 350, 450, 475, 525, 525, 525, 525 |
| L/D | 30:1 |
| Melt Temperature | 525 deg F. (274 C.) |
| Line Speed | 150 fpm (46 m/min) |
| Air Gap | 5.5 inches (0.14 m) |
| Die Gap | Cold set to 0.020 inches (20 mil) |

Fast Tensile Procedure

The tensile dta was run as follows:

| | |
|---|---|
| Equipment: | Sintech Tensile Tester |
| Method: | Fast R/C Tensile |
| Initial Speed: | 2.0 inches/minute (50.8 mm/min.) (ASTM Standard - 50% of Guage Length to gather modulus data). |
| Nominal Guage length | 4.0 inches (101.6 mm) |
| Secondary Speed | 39.4 inches/minute (100.1 cm/min.) |
| Sample Width | 15.0 mm |

Example 2

This example was prepared the same as sample #1 except for the addition of PA609 which is an organic stiffness enhancing additive. Resin additive PA609 (derivatized cyclopentadiene master batch in polypropylene) was obtained from Exxon-Mobil and dry blended with PF611 in the ratio 10:90 by weight. The composition was then extrusion coated at the same coverage onto the same cellulose paper base using the extrusion coating conditions specified in Table 1 (Sample 1B). Release sheets were inserted between the extrudate and paper base so as to obtain thin films of the extrudate which were then tested for Young's modulus.

Example 3

This example was prepared the same as example #2 except resin additive PA609 was dry blended with PF611 in the ratio 20:80 by weight. The composition was then extrusion coated onto cellulose paper base using the extrusion coating conditions specified in Table 1 (Sample 1C). Release sheets were inserted so as to obtain thin films of the extrudate which were then tested for Young's modulus.

Example 4

This example was prepared the same as example #1 except a talc additive was included. Talc Mistron® CB, obtained from Luzenac, was compounded in a twin-screw compounder into PF611 along with 1.5% calcium stearate as a slip agent, to form a 40% talc master batch. The concentrate was then dry-blended in a 50:50 ratio with PF6111 homopolymer and extrusion coated at the same coverage onto cellulose paper base using the extrusion coating conditions specified in Table 1 (Sample 1D). Release sheets were inserted so as to obtain thin films of the extrudate which were then tested for Young's modulus.

Example 5

This example was the same as example 4 except the amount of talc was increased. The 40% talc master batch was dry-blended in a 75:25 ratio with PF611 homopolymer and extrusion coated onto cellulose paper base using the extrusion coating conditions specified in Table 1 (Sample 1E). Release sheets were inserted so as to obtain thin films of the extrudate which were then tested for Young's modulus.

Example 6

This example was prepared to evaluate the effect of talc and PA 609 resin additive. The 40% talc master batch was dry-blended in a 50:20:30 ratio with PA609 and PF611 homopolymer and extrusion coated at the same coverage as the previous examples onto the same cellulose paper base using the extrusion coating conditions specified in Table 1 (Sample 1F). Release sheets were inserted so as to obtain thin films of the extrudate which were then tested for Young's modulus. Table 2 lists the composition of each sample in parts by weight of each of the major components.

TABLE 2

| SAMPLE | PF611 Wt. % | PA609 Wt. % | Talc Wt. % |
|---|---|---|---|
| Example 1 - 1A | 100 | 0 | 0 |
| Example 2 - 1B | 90 | 10 | 0 |
| Example 3 - 1C | 80 | 20 | 0 |
| Example 4 - 1D | 80 | 0 | 20 |
| Example 5 - 1E | 70 | 0 | 30 |
| Example 6 - 1F | 60 | 20 | 20 |

Table 3 lists the machine direction (MD) Young's modulus measured for each sample as a function of time. It can be seen that example 1 which is a control sample without any stiffness enhancing agents does not appreciably exhibit an increase in modulus (within experimental error of the test) when compared to examples 2 which has 10% by weight of PA609. The data for example 3 may suggest that there is a critical amount of PA 609 which, when exceeded, does not contribute to modulus enhancement. Examples 4 and 5 use a pigment (talc) to provide modulus and do not contain PA609. When the data for examples 4 and 5 are compared to example 1, it is noted that between 20–30% by weight of talc there is a significant increase in modulus. When comparing the data for example 4 vs. example 6, it is noted that the addition of PA609 at the same weight % of talc in the resin demonstrates a significant improvement in modulus for both 1 day and aged samples.

TABLE 3

| | Day 1 Young's Modulus- psi/MPa MD | Day 7 Young's Modulus- psi/MPa MD | Day 14 Young's Modulus- psi/MPa MD |
|---|---|---|---|
| Example 1 (Control) | 84442/582 | 89036/614 | 87998/607 |
| Example 2 | 101742/702 | 138332/954 | 119336/823 |
| Example 3 | 132754/915 | 110781/764 | 130063/897 |
| Example 4 | 100576/693 | 112667/777 | 105225/726 |
| Example 5 | 117136/808 | 116852/806 | 160327/1105 |
| Example 6 | 145219/1001 | 140154/966 | 156820/1081 |

Example 7–8

The samples prepared for examples 7–8 did not use a cellulose paper base but instead used an extruded foam core (manufactured by Now Plastics 6 mils). The foam core is made primarily of polypropylene although it contains a small amount (<10%) of polyethylene. The density of the foam core used was 0.53 g/cm$^3$. The foam core was used as purchased without any further modification to the surface or materials. Each side of the foam core was extrusion coated with polyolefin. Table 4 Letter A provide the materials, their composition and coverage for Example 7 and Table 4 Letter B provide the conditions for examples 8.

In both cases the face skin and face stiffening flange were coextruded onto the face side of the foam core. The back side of the foam core was extrusion coated with a stiffening flange layer only (no polyethylene outer skin) The stiffness of the imaging element or member was measured as a function of time.

TABLE 4

| | Composition | Layer Thickness | Weight |
|---|---|---|---|
| Letter A | | | |
| Face skin | 82% 4002P (Eastman Chemical 0.917 g/cc low density polyethylene) with 18% Anatase AHR TiO$_2$ manufactured by Tioxide, Inc. | 0.5 mil | 12.2 g/m$^2$ |
| Face stiffening flange | 52% PF611, 20% PA609, 20% Talc, 8% AHR TiO$_2$ | 1.75 mil | 43.0 g/m$^2$ |
| Foam | Now Plastics | 6 mil | |
| Back stiffening flange | 52% PF611, 20% PA609, 20% Talc, 8% AHR TiO$_2$ | 1.75 mil | 43.0 g/m$^2$ |
| Total | Avg. Stiffness~150 mN | 10.0 mil | |
| Letter B | | | |
| Face skin | 82% 4002P, 18% TiO$_2$ Anatase AHR | 0.5 mil | 12.2 g/m$^2$ |
| Face Stiffening flange | 62% PF611, 10% PA609, 20% Talc, 8% TiO$_2$ | 1.75 mils | 43.0 g/m$^2$ |
| Foam | Now Plastic | 6 mils | |
| Back Stiffening flange | 62% PF611, 10% PA609, 20% Talc, 8% TiO$_2$ | 1.75 mils | 43.0 g/m$^2$ |
| Total | Avg Stiffness = 130 mN | 10.0 mils | |

Colorimetry was measured on an UltraScan XE Colorimeter made by Hunter Associates Laboratory using a D 6500 light source without (UVO) UV light excitation of the sample.

Opacity was measured according to ASTM method E308-96, specular reflectance was included, and the testing was done by measuring one sheet black by black and then black by white (Baryta).

Stiffness was measured using a Lorentzen and Wetter type tester according to Tappi Method T 556. The bending resistance in milliNewtons of a 20 mm wide vertically clamped sample is measured for a 15° deflection angle.

TABLE 5

Average MD & CD stiffness (Mn):

| | Letter A Example 7 | Letter B Example 8 |
|---|---|---|
| Day 1 | 82 | 56 |
| Day 10 | 86 | 69 |
| Day 17 | 101 | 75 |

As seen in Table 5, examples 7 (A) and 8 (B) were prepared by resin coating stiffening flange layers on a foam core base. Both these examples exhibit a significant increase in stiffness with time when an amorphous hydrocarbon is used in a polyolefin extrusion coated layer.

TABLE 6

| Sample | CALIPER (mils) | APPARENT DENSITY (g/cc) |
|---|---|---|
| FOAM | 6.03 | 0.532 |
| 92A | 8.62 | 0.877 |
| 92B | 8.29 | 0.862 |
| Control | 8.07 | 1.100 |

TABLE 7

| | UVO | | | |
|---|---|---|---|---|
| Sample | L*- | a*- | b*- | Opacity |
| Foam-Inside | 87.48 | −0.56 | −1.20 | 76.41 |
| 92 A | 93.09 | −0.56 | −2.14 | 93.19 |
| 92 B | 92.34 | −0.49 | −2.09 | 93.26 |
| Control | 93.35 | −0.44 | −2.93 | 94.12 |

Example 9

Resin additive Res® P2567 was obtained from Eastman Chemical Co. and dry blended with PF611 in the ratio 10:90 by weight. The composition was then extrusion coated onto cellulose paper base using the extrusion coating conditions specified in Table 2 (Sample 2B). Release sheets were inserted so as to obtain thin films of the extrudate which were then tested for Young's modulus.

Example 10

Resin additive Res® A2661 was obtained from Eastman Chemical Co. and dry blended with PF611 in the ratio 10:90 by weight. The composition was then extrusion coated onto cellulose paper base using the extrusion coating conditions specified in Table 2 (Sample 2C). Release sheets were inserted so as to obtain thin films of the extrudate which were then tested for Young's modulus.

Example 11

Resin additive Regalite® R1125 was obtained from Eastman Chemical Co. and dry blended with PF611 in the ratio 10:90 by weight. The composition was then extrusion coated onto cellulose paper base using the extrusion coating conditions specified in Table 2 (Sample 2D). Release sheets were inserted so as to obtain thin films of the extrudate which were then tested for Young's modulus.

Example 12

Resin additive Piccolyte® C135 was obtained from Eastman Chemical Co. and dry blended with PF611 in the ratio 10:90 by weight. The composition was then extrusion coated onto cellulose paper base using the extrusion coating conditions specified in Table 2 (Sample 2D). Release sheets were inserted so as to obtain thin films of the extrudate which were then tested for Young's modulus.

Example 13

Resin additive MBG 273 was obtained from Eastman Chemical Co. and dry blended with PF611 in the ratio 10:90 by weight. The composition was then extrusion coated onto cellulose paper base using the extrusion coating conditions specified in Table 2 (Sample 2E). Release sheets were inserted so as to obtain thin films of the extrudate which were then tested for Young's modulus.

TABLE 8

| Letter | Formulation |
|---|---|
| A | PF611 |
| B | 80% PF611 + 20% PA609 |
| C | L01-080-A (Res P2567) |
| D | L01-080-B (Res A2661) |
| E | L01-080-C (Regalite R1125) |
| F | L01-080-E (Piccolyte C135) |
| G | L01-080-F (MBG 273) |

TABLE 9

| Sample ID | | Thickness mil | Break Elongation % | Young's Modulus psi/MPa | Amorphous Hydrocarbon |
|---|---|---|---|---|---|
| D01-097-A | MD | 2.09 | 473.15 | 79411.0/548 | NO |
| D01-097-B | MD | 2.04 | 3.37 | 119573.0/824 | Yes |
| D01-097-C | MD | 2.02 | 167.67 | 92215.3/636 | Yes |
| D01-097-D | MD | 2.36 | 3.77 | 114399.7/789 | Yes |
| D01-097-E | MD | 2.43 | 3.53 | 113854.7/785 | Yes |
| D01-097-F | MD | 2.71 | 3.97 | 114239.0/788 | Yes |
| D01-097-G | MD | 2.24 | 3.47 | 115439.7/796 | Yes |
| D01-097-A | CD | 2.06 | 6.05 | 73506.0/507 | NO |
| D01-097-B | CD | 1.98 | 3.17 | 119805.3/826 | Yes |
| D01-097-C | CD | 2.07 | 4.07 | 107710.3/743 | Yes |
| D01-097-D | CD | 2.30 | 3.30 | 123810.3/854 | Yes |
| D01-097-E | CD | 1.96 | 3.23 | 124892.7/861 | Yes |
| D01-097-F | CD | 2.27 | 3.70 | 115203.0/794 | Yes |
| D01-097-G | CD | 1.79 | 2.80 | 111836.3/771 | Yes |

The data from Table 9 show that when a variety of amorphous hydrocarbons are added to a polyolefin extrusion coated layer that the stiffness is significantly increased. The can be seen by comparing sample A of Table 9 against samples B–G. The effect is seen in both the MD (machine direction) as well as the CD (cross direction).

Example 14

The following example is based upon the results of a mathematical stiffness model developed from bending theory. Typical representative values are used for a paper core for modulus and caliper. Typical representative results are also used for flange caliper and modulus without and with amorphous hydrocarbon stiffening agent. In this example, Flange A is the control without any amorphous hydrocarbon resin additive while Flange B is an example of an element of the invention, and contains 10% by weight of a typical amorphous hydrocarbon resin, which results in an increase in modulus of approximately 50%.

Table 10 below summarizes the results. As shown, the increase in flange modulus, while keeping everything else constant, results in an average increase of about 14 units of stiffness. This may be used as below to create an element of superior stiffness. Alternatively, it may be used to reduce core caliper to 145 micrometers while maintaining the average stiffness constant (at 146 mN).

TABLE 10

| | Caliper (micrometers) | Modulus (MPa) | | | Avg. Stiffness mN |
|---|---|---|---|---|---|
| | | MD | CD | Average | |
| Core | 150 | 6205 | 4826 | 5516 | — |
| Flange A | 37.5 | — | — | 551 | 146 |
| Flange B | 37.5 | — | — | 830 | 160 |

The invention has been described in detail with particular reference to certain preferred embodiments thereof, but it will be understood that variations and modifications can be effected within the spirit and scope of the invention.

What is claimed is:

1. An imaging member comprising an imaging layer and at least one stiffening layer on a support, wherein said stiffening layer comprises a blend of polyolefin polymer and amorphous hydrocarbon resin, and wherein said hydrocarbon resin comprises a resin having carbon backbone units of from 8 to 24.

2. The imaging member of claim 1 wherein said amorphous hydrocarbon resin has a softening temperature of greater than 30 degrees Centigrade.

3. The imaging member of claim 2 wherein said amorphous hydrocarbon resin has a softening temperature from 70 degrees to 180 degrees Centigrade.

4. The imaging member of claim 1, wherein said hydrocarbon resin comprises rosin.

5. The imaging member of claim 1, wherein said amorphous hydrocarbon resin is present in an amount of from 2 to 50% by weight of said blend.

6. The imaging member of claim 1, wherein said amorphous hydrocarbon resin is present in an amount of from 10 to 20% by weight of said blend.

7. The imaging member of claim 1, wherein said amorphous hydrocarbon resin comprises hydrogenated cyclopentadiene.

8. The imaging member of claim 1, wherein said amorphous hydrocarbon resin is at least one member selected from the group consisting of pure monomer hydrocarbon resins, physical blends of hydrogenated hydrocarbon resins, partially hydrogenated hydrocarbon resins, fully hydrogenated hydrocarbon resins, and polyterpenes.

9. The imaging member of claim 1, wherein said polyolefin polymer comprises polypropylene.

10. The imaging member of claim 1 wherein said stiffening layer is extruded.

11. The imaging member of claim 1, wherein said stiffening layer further comprises pigment.

12. The imaging member of claim 1, wherein said stiffening layer further comprises talc.

13. The imaging member of claim 1, wherein said stiffening layer further comprises titanium dioxide pigment.

14. The imaging member of claim 1, wherein said stiffening layer comprises an unoriented layer.

15. The imaging member of claim 1, wherein said stiffening layer comprises an oriented layer.

16. The imaging member of claim 15, wherein said oriented layer is bonded to a polymer foam layer.

17. The imaging member of claim 15, wherein said oriented layer is bonded to paper.

18. The imaging member of claim 15, wherein said oriented layer is bonded to a fabric.

19. The imaging member of claim 15, wherein said oriented layer is bonded to a polymer sheet having a light transmission of greater than 20%.

20. The imaging member of claim 1, wherein said stiffening layer is bonded to paper.

21. The imaging member of claim 20 wherein said paper comprises less than 75 weight % of said imaging member.

22. The imaging member of claim 20, wherein said stiffening layer is bonded to inorganic coated paper.

23. The imaging member of claim 1 wherein said imaging member is extruded.

24. The imaging member of claim 1 wherein said support comprises a modulus less than the modulus of said stiffening layer.

25. The imaging member of claim 1, wherein said support comprises a polymer sheet having a light transmission of greater than 20%.

26. The imaging member of claim 1, wherein said support comprises a polymer foam layer.

27. The imaging member of claim 1 wherein said at least one stiffening layer comprises a modulus from 700 MPa to 10500 MPa.

28. The imaging member of claim 1, wherein said support comprises paper.

29. The imaging member of claim 1, wherein said support comprises a fabric.

30. The imaging member of claim 1, further comprising a polyethylene layer between said stiffening layer and said imaging layer.

31. The imaging member of claim 1, further comprising a subbing layer between said stiffening layer and said imaging layer.

32. The imaging member of claim 1, wherein said imaging layer comprises at least one layer comprising photosensitive silver halide.

33. The imaging member of claim 1, wherein said imaging layer comprises at least one layer comprising inkjet receiving material.

34. The imaging member of claim 1, wherein said imaging layer comprises at least one layer comprising thermosensitive imaging material.

35. The imaging member of claim 1, wherein said imaging layer comprises at least one layer comprising electrophotographic imaging material.

36. The imaging member of claim 1 wherein said at least one stiffening layer has a modulus greater than said imaging layer.

37. The imaging member of claim 1 wherein said imaging member comprises less than 75 weight % paper.

38. A method of forming an imaging member comprising extruding a foam polymer sheet; orienting said foam polymer sheet; bringing at least one stiffening layer into contact with the oriented foam polymer sheet, wherein said stiffening member comprises a blend of polyolefin polymer and amorphous hydrocarbon resin; and applying an imaging layer above said stiffening layer, and wherein said hydrocarbon resin comprises a resin having carbon backbone units of from 8 to 24.

39. The method of claim 38 wherein said amorphous hydrocarbon resin has a softening temperature of greater than 30 degrees Centigrade.

40. The method of claim 39 wherein said amorphous hydrocarbon resin has a softening temperature from 70 degrees Centigrade to 180 degrees Centigrade.

41. The method of claim 38 wherein said bringing at least one stiffening layer into contact comprises extrusion coating said blend onto said foam polymer sheet.

42. The method of claim 38 wherein said bringing at least one stiffening layer into contact comprises adhesively connecting said stiffening layer to said foam polymer sheet.

43. The method of claim 38, wherein said stiffening layer comprises an oriented layer.

44. The method of claim 38, wherein said amorphous hydrocarbon resin is at least one member selected from the group consisting of pure monomer hydrocarbon resins, physical blends of hydrogenated hydrocarbon resins, partially hydrogenated hydrocarbon resins, fully hydrogenated hydrocarbon resins, and polyterpenes.

45. The method of claim 38, wherein said amorphous hydrocarbon resin is present in an amount of from 2 to 50% by weight of said blend.

46. The method of claim 38, wherein said amorphous hydrocarbon resin is present in an amount of from 10 to 20% by weight of said blend.

47. The method of claim 38, wherein said stiffening layer further comprises talc.

48. The method of claim 38, wherein said stiffening layer further comprises titanium dioxide pigment.

49. The method of claim 38, wherein said at least one stiffening layer comprises a modulus from 700 MPa to 10500 MPa.

50. The method of claim 38, wherein said polyolefin polymer comprises polypropylene.

51. The method of claim 38, further comprising a polyethylene layer between said stiffening layer and said imaging layer.

52. The method of claim 38, further comprising a subbing layer between said stiffening layer and said imaging layer.

53. The method of claim 38 wherein said foam polymer sheet comprises a modulus less than the modulus of said stiffening layer.

54. The method of claim 38, wherein said imaging layer comprises at least one layer comprising photosensitive silver halide.

55. The method of claim 38, wherein said imaging layer comprises at least one layer comprising inkjet receiving material.

56. The method of claim 38, wherein said imaging layer comprises at least one layer comprising thermosensitive imaging material.

57. The method of claim 38, wherein said imaging layer comprises at least one layer comprising electrophotographic imaging material.

58. The method of claim 38 wherein said imaging member comprises less than 75 weight % paper.

59. A method of forming an imaging member comprising extruding a foam polymer sheet; bringing at least one stiffening layer into contact with the foam polymer sheet, wherein said stiffening layer comprises a blend of polyolefin polymer and amorphous hydrocarbon resin; orienting said foam polymer sheet and said stiffening layer; and applying an imaging layer above said stiffening layer, and wherein said hydrocarbon resin comprises a resin having carbon backbone units of from 8 to 24.

60. The method of claim 59 wherein said amorphous hydrocarbon resin has a softening temperature of greater than 30 degrees Centigrade.

61. The method of claim 60 wherein said amorphous hydrocarbon resin has a softening temperature from 70 degrees to 180 degrees Centigrade.

62. The method of claim 59, wherein said amorphous hydrocarbon resin is at least one member selected from the group consisting of pure monomer hydrocarbon resins, physical blends of hydrogenated hydrocarbon resins, partially hydrogenated hydrocarbon resins, fully hydrogenated hydrocarbon resins, and polyterpenes.

63. The method of claim 59, wherein said amorphous hydrocarbon resin is present in an amount of from 2 to 50% by weight of said blend.

64. The method of claim 59, wherein said amorphous hydrocarbon resin is present in an amount of from 10 to 20% by weight of said blend.

65. The method of claim 59, wherein said stiffening layer further comprises talc.

66. The method of claim 59, wherein said stiffening layer further comprises titanium dioxide pigment.

67. The method of claim 59 wherein said bringing at least one stiffening layer into contact comprises extrusion coating said blend onto said foam polymer sheet.

68. The method of claim 59 wherein said bringing at least one stiffening layer into contact comprises adhesively connecting said stiffening layer to said foam polymer sheet.

69. The method of claim 59 wherein said at least one stiffening layer comprises a modulus from 700 MPa to 10500 MPa.

70. The method of claim 59, wherein said polyolefin polymer comprises polypropylene.

71. The method of claim 59, further comprising a polyethylene layer between said stiffening layer and said imaging layer.

72. The method of claim 59, further comprising a subbing layer between said stiffening layer and said imaging layer.

73. A method of forming an imaging member comprising providing a cellulosic sheet; bringing at least one stiffening layer into contact with said cellulosic sheet, wherein said stiffening layer comprises a blend of polyolefin polymer and amorphous hydrocarbon resin; and applying an imaging layer above said stiffening layer, and wherein said hydrocarbon resin comprises a resin having carbon backbone units of from 8 to 24.

74. The method of claim 73 wherein said imaging member comprises less than 75 weight % paper.

75. The method of claim 73 wherein said cellulosic sheet comprises coated paper.

76. The method of claim 73 wherein said amorphous hydrocarbon resin has a softening temperature of greater than 30 degrees Centigrade.

77. The method of claim 74 wherein said stiffening layer has a softening temperature of from 70 degrees to 180 degrees Centigrade.

78. The method of claim 73, wherein said amorphous hydrocarbon resin is at least one member selected from the group consisting of pure monomer hydrocarbon resins, physical blends of hydrogenated hydrocarbon resins, partially hydrogenated hydrocarbon resins, fully hydrogenated hydrocarbon resins, and polyterpenes.

79. The method of claim 73, wherein said stiffening layer further comprises talc.

80. The method of claim 73, wherein said stiffening layer further comprises titanium dioxide pigment.

81. The method of claim 73, wherein said polyolefin polymer comprises polypropylene.

82. The method of claim 73, further comprising a polyethylene layer between said stiffening layer and said imaging layer.

83. The method of claim 73, further comprising a subbing layer between said stiffening layer and said imaging layer.

84. An imaging member comprising an imaging layer and at least one stiffening layer on a support, wherein said stiffening layer comprises a blend of polyolefin polymer and amorphous hydrocarbon resin, wherein said hydrocarbon resin comprises a resin having carbon backbone units of from 8 to 24, and wherein said support comprises a modulus less than the modulus of said stiffening layer.

* * * * *

UNITED STATES PATENT AND TRADEMARK OFFICE
CERTIFICATE OF CORRECTION

| | | |
|---|---|---|
| PATENT NO. | : 6,762,003 B2 | Page 1 of 1 |
| APPLICATION NO. | : 10/154887 | |
| DATED | : July 13, 2004 | |
| INVENTOR(S) | : Suresh Sunderrajan et al. | |

It is certified that error appears in the above-identified patent and that said Letters Patent is hereby corrected as shown below:

Col. 31, Claim 27, Line 20 after "claim" delete "1" and insert --26--

Signed and Sealed this

Sixteenth Day of October, 2007

JON W. DUDAS
*Director of the United States Patent and Trademark Office*